US005557623A

United States Patent [19]
Discoll

[11] Patent Number: 5,557,623
[45] Date of Patent: Sep. 17, 1996

[54] ACCURATE DIGITAL FAULT TOLERANT CLOCK

[75] Inventor: Kevin R. Discoll, Maple Grove, Minn.

[73] Assignee: Honeywell Inc., Minneapolis, Minn.

[21] Appl. No.: 289,728

[22] Filed: Aug. 12, 1994

[51] Int. Cl.[6] .................................................. G11B 27/00
[52] U.S. Cl. .................................. 371/61; 371/36
[58] Field of Search ....................... 371/61, 57.2, 47.1, 371/36, 62, 22.1; 395/550, 575; 307/409, 141; 327/144, 151, 141

[56] References Cited

U.S. PATENT DOCUMENTS

| 4,239,982 | 12/1980 | Smith et al. | 375/108 |
| 4,864,574 | 9/1989 | Pritt | 371/61 |
| 4,972,414 | 11/1990 | Borkenhagen et al. | 371/22.3 |
| 4,979,191 | 12/1990 | Bond et al. | 307/219 |
| 4,984,241 | 1/1991 | Truong | 371/36 |
| 5,109,506 | 4/1992 | Begun | 395/575 |

FOREIGN PATENT DOCUMENTS

| 0107236 | 5/1984 | European Pat. Off. . |
| 0176464 | 12/1990 | European Pat. Off. . |
| 3023624 | 10/1980 | Germany . |

OTHER PUBLICATIONS

"Clock failure recovery by automatic reinitialization and subsequent system restart" vol. 32, No. 3B, Aug. 1989.
B. H. Tulpule et al., "Achieving Fault Tolerance in Multichannel Control Systems", Oct. 14, 1991, Proceedings IEEE/AIAA 10th Digital Avionics Systems Conference, Los Angeles, California,, pp. 275–280.

Primary Examiner—Robert W. Beausoliel, Jr.
Assistant Examiner—Phung M. Chung
Attorney, Agent, or Firm—John G. Shudy, Jr.

[57] ABSTRACT

This invention relates to fault-tolerant real-time clock capable of withstanding n-faults, including Byzantine faults. In particular, the instant invention produces redundant clock signals which have low skew with respect to each other, operate with extremely high accuracy, and can be constructed without use of analog electric components, with the exception of oscillators. The present fault tolerant clock is composed of three types of electrical subcircuits coupled together: oscillators/counters, sequential edge voters, and regular voters. Each of these subcircuits can be duplicated and coupled appropriately as needed to form a clock mechanism tolerant of any number of faults in the clock circuitry while maintaining an extremely precise timing mechanism suitable for accurately integrating and differentiating signals with respect to time.

6 Claims, 4 Drawing Sheets

ACCURATE DIGITAL FAULT TOLERANT CLOCK

FIELD OF THE INVENTION

This invention relates to fault-tolerant real-time clocks capable of withstanding N-faults, including Byzantine faults. In particular, the instant invention produces redundant clock signals which have low skew with respect to each other, operate with extremely high accuracy, and can be constructed without use of analog electric components, with the exception of oscillators.

BACKGROUND OF THE INVENTION

For the sake of safety and reliability, critical computing tasks often times rely on redundant components or systems based on highly accurate, fault-tolerant timing schemes so that variations in performance of system components can be compared and, if warranted, removed from service. Such timing schemes are very important for processors that must be synchronized for voting or that integrate or differentiate sampled inputs with respect to time. Such systems rely on an accurate clock to keep the output accurate. Inertial navigation systems are a typical example of a system that must integrate and differentiate input signals accurately so that position may be properly maintained.

An exercise in logic analysis known as the Byzantine Generals' Problem establishes the concept of a Byzantine fault, the occurrence of which many different prior fault tolerant schemes have attempted to mitigate. A Byzantine fault is any fault which presents different symptoms to different observers. A Byzantine Generals' Problem is simply any Byzantine fault that can lead to a system failure. The classic exercise shows that if there are N generals operating to defeat any enemy, more than two thirds of N generals must be loyal to guarantee that the loyal generals can properly reach agreement on a plan of battle. By analogy, a single clock channel failure can prevent two other clock channels from being correctly synchronized. Thus, at least four clock fault containment regions are required to tolerate a single Byzantine fault. For F Byzantine faults to be tolerated, the system needs at least 3F+1 fault containment regions and F rounds of communication.

The previous art in digital clock fault tolerance is diverse and tries to solve many problems. Some of the teachings do not understand all of the problems or understand them incompletely. None of the previous art solves all of the problems to the degree the current invention does. The previous art has one or more of the following main problems:

(a) Insufficient Accuracy—It has been recognized in much of the prior art that delays in the voting and exchange circuitry of a fault-tolerant clock adds to inaccuracy. What has been under-recognized is the fact the integration used in most phase locked loops (PLLs) for various fault-tolerant clock designs can be an even larger impact on inaccuracy. For example, in the often cited paper "Fault-tolerant Clocking System" published in the digest of papers for the 1991 International Symposium on Fault-Tolerant Computing, the author presents an analysis of the phase locked loops as used in the related U.S. Pat. No. 4,239,982 and also comments on the adverse effects of delay on accuracy; but fails to recognize the adverse effects of the integrators (low pass filters) in the PLLs on accuracy. The paper "Achievable Performance of Fault-tolerant Avionics Clocks" by Krause, Englehart, and Shaner for the 8th Computing in Aerospace Conference, 1991 details the adverse effects of integrators in cross-strapped PLLs as commonly used in fault-tolerant clocks. This finding is counter-intuitive to most practitioners of the art. Another counter-intuitive finding is that accuracy is maximized when the voting rate is minimized. These concepts are addressed by this invention.

(b) Not Digital—Most fault-tolerant clock designs of the previous art have some analog components which directly effect the accuracy and fault tolerance of the clocking mechanism. Analog components have tolerances, changes with age, failure modes, and fault propagation modalities that make them hard to reason about in a formal way such that mathematical proofs of correctness can be applied. In the current digital technology development, digital components are becoming very dense, cheap, and have standardized physical dimensions. Using analog components in an otherwise digital systems adds a disproportionate cost to the system.

(c) Use Naive Fault Tolerance Assumptions—Most fault-tolerant clock designs assume failures are only the simple "stuck-at" or too-fast/too-slow types. Some have begun recognizing, but not fully understanding, Byzantine faults. Only a few include provisions for over-voltage and similar faults. Most ignore the problems of metastability induced errors and all possible start-up scenarios. Metastability and start-up pathologies can cause many so-called fault-tolerant clocks to fail, even with no component failures. Some start-up pathologies are unavoidable in totality, but can be minimized if understood. Another example from U.S. Pat. No. 4,239,982, is that it requires an even number of clock sources. This can be seen as diametrically opposed to best practice when one looks at the possibility of one-half of the clock sources starting exactly in-phase with each other and exactly 180 degrees out-of-phase with the other one-half of the clock sources. There is no way of guaranteeing that this condition will not persist indefinitely. On the other hand, an odd number of clocks cannot get into this one-half versus one-half situation.

The design of fault-tolerant clocks can be divided into the following groups based on the means they use to cross-couple their redundancies:

(a) Coupling of pulses directly into the feedback path of the oscillators—This can be done with simple analog components, but this has the problems of analog components stated above; particularly, it is extremely difficult to guarantee, to a high confidence, that all fault effects are contained within their respective fault containment regions. This coupling can also be done digitally with voting. In this case, inaccuracy is maximized because delay errors are injected at the highest possible rate.

(b) Primary with backup(s)—These schemes can be highly accurate because feedback errors do not contribute to inaccuracy. However, they are not very fault tolerant. It is difficult to create a fault detection mechanism which has guaranteed high coverage and can cause a switch between a faulty primary to a good backup before the faulty primary signal causes harm to the rest of the system. Most of these schemes do not address system failures caused by Byzantine faults.

(c) Peer, cross-coupled digital signals—This group has the best possibility of meeting all the requirements of an accurate, truly fault-tolerant clock.

The present invention belongs to the latter group.

SUMMARY OF THE INVENTION

The apparatus of the instant invention produces redundant clock signals through a plurality of clock sources, each having an output signal of preselected frequency and responsive to an input signal which adjusts the phase of the output signal, a plurality of sequential edge voters, each producing a signal whenever a change of state occurs on a preselected number of the clock source output signals followed by an opposite change of state on a preselected number of the clock source output signals so that the output signal of each sequential edge voter controls the input signal to at least one of the clock sources. The phase adjustment in the clock sources preferentially results from a digital phase locking mechanism. Correction can be made for signal propagation delays occurring due to signal transit time from the clock source outputs through the voters and back through the clock source inputs. These signal propagation delays can be determined by a calibration procedure in which the sequential edge voters are temporarily configured to produce an output signal whenever a change of state occurs on one of the clock source output signals followed by the opposite state change on the same signal, and one of the clock sources measures the delay from its output signal to its input signal.

DESCRIPTION OF THE PREFERRED EMBODIMENT

Figure 1:
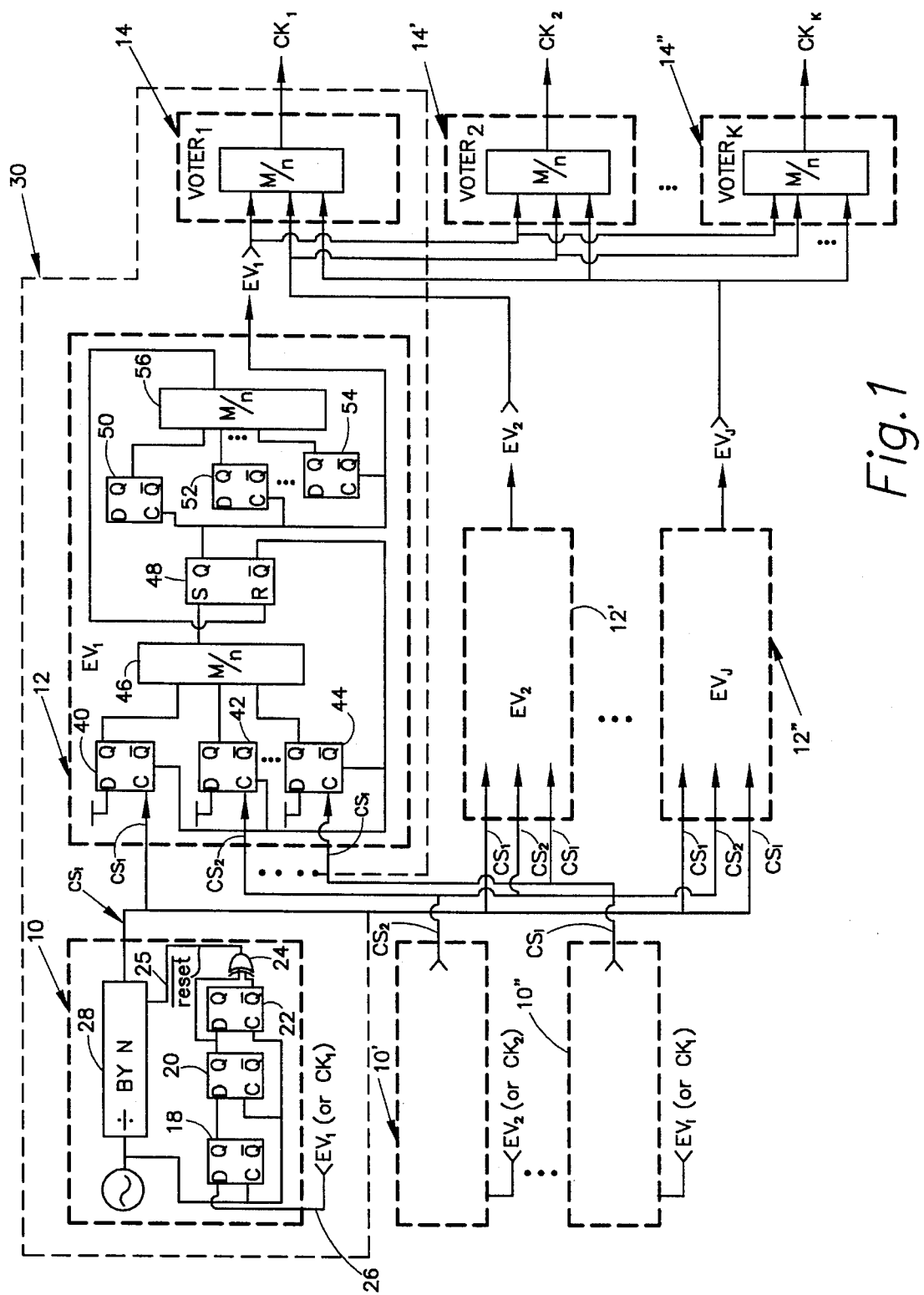
FIG. 1 is an electrical diagram depicting the primary circuitry of the preferred mode of the present invention. The triple dot notation is meant to show that many iterations of the adjacent circuitry is within the purview of the present invention.

The present fault tolerant clock is composed of three types of electrical subcircuits coupled together: clock source 10, edge voters 12, and regular voters 14. Each of these subcircuits can be duplicated as much as needed to tolerate any number of faults in the clock circuitry. For example, by adding rows of the standard subcircuit ("fault tolerant regions") fault tolerance is increased by one additional fault for each row. To tolerate Byzantine faults one row and one column (m-out-of-n voter subcircuit) are added. Additional Byzantine fault tolerance obtains with each column and row added. In FIG. 1, there are depicted i clock sources, j edge voters and k voters. Depending on differing circuit dependibilities, the values of i, j, and k can be different. The outputs of these subcircuits are termed $CS_x$, $EV_x$, and $CK_x$, respectively. The subscript x uniquely identifies the output signals and their respective subcircuits of origin. In the ideal case, absent circuit propagation delays and no faults, all of these signals would be identical. For the remainder of this specification, the nominal frequency and period of these signals will be called the "clock frequency" and "clock period" respectively. The term "accuracy" is used herein as a measure of how closely the actual frequency and periods match the nominal for each subcircuit.

One of each type of subcircuits 10,12,14 having the same subscript can be grouped together into a single fault containment region 30. Likewise, subcircuits 10', 12', 14' can be grouped into a second single fault containment region (10", 12",14" can form the nth single fault containment region).

Each fault containment region 30 can be implemented in a single digital ASIC. For homogeneous redundancy, i=j=k. All $CS_x$ and $EV_x$ signals can be passed through electrical isolation devices (not shown) such as opto-isolators, to block electrical faults originating remotely from other subcircuits so that only relatively clean and valid digital signals affect the system. Each gate 16 within regular voters 14 and each gate 46,56 within each edge voter 12, designated by the notation "m/n" in FIG. 1, is an m-out-of-n gate which delivers a true (logical "1") output if, and only if, m or more of the inputs to gate 16 are true. The threshold m and the value of n (number of redundancies) can be adjusted for the level of fault tolerance desired (i.e., single, double, etc.). Both m and n must be integers with m less than n and usually greater than one-half n, that is, $n/2<m<n$. The m-out-of-n gate 16 is commonly practiced in the fault tolerance art.

Each clock source (CS) 10 functions as a phase locking mechanism keeping its output signal $CS_x$ in phase with its input signal 26 (either $EV_x$ or $CK_x$). This phase locking mechanism, while locking the phase of its output to its input, is not a classical phase lock loop; it has none of the main components of a classical PLL, namely: no phase detector or compensator, no filter or comparator, and no variable frequency oscillator. $EV_x$ should be used as the input 26 to the CS 10 only when accuracy is of paramount importance and fault tolerance can be sacrificed to get a small increase in accuracy. Because using $CK_x$ as the input 26 provides much greater fault tolerance (including protection against Byzantine faults) at the cost of a minor loss in accuracy. The three D flip-flops 18,20,22 in each CS 10 form a synchronizer and a digital one-shot circuit for shaping the pulse to provide a clean, one-oscillator-period long, reset signal for the counter 28. The first two flip-flops 18,20 implement a well-known two-stage synchronizer. The synchronizer is needed because the circuit propagation delays and any faults encountered may make the input 26 to the CS 10 asynchronous with respect to its oscillator. The second two flip-flops 20,22 and the OR gate 24 form a one-shot which has a low going (logical 0) output pulse with a width equal to the period of the oscillator and occurs for each falling edge of the input 26 to the CS 10. This pulsed signal reloads the counter 28, resident within the CS 10, to zero (or to the delay compensation factor, if used) at the point where all the signals, $EV_x$, $CS_x$, and $CK_x$, have just gone to logical zero and thus locks the phase of the output $CS_x$ of the counter 28 to the rest of these signals.

The clock accuracy is determined by the inherent oscillator accuracy and the errors introduced by the rest of the circuitry. An error is introduced each clock period that is equal to the propagation delay around the loop from output of the counter 28 ($CS_x$) through all the voters 12 and 14 and back through input 26, flip-flop 18, flip-flop 20, and OR gate 24 and the resets 25 of the counter 28 which create the $CS_x$ signals. The propagation delay around the loop is herein termed loop delay. To maximize accuracy of the clock, the loop delay should be as small as possible with respect to the clock period. This can be done two ways, by minimizing loop delay (using fast circuitry) or by maximizing the clock period. Part of the loop delay is the one-oscillator-period ambiguity in the synchronizer due to the synchronizer first stage becoming metastable and thus adding one cycle of uncertainty. Thus, the oscillator period should be minimized while still being large enough to not incur excessive metastability errors in the synchronizer.

Figure 3:
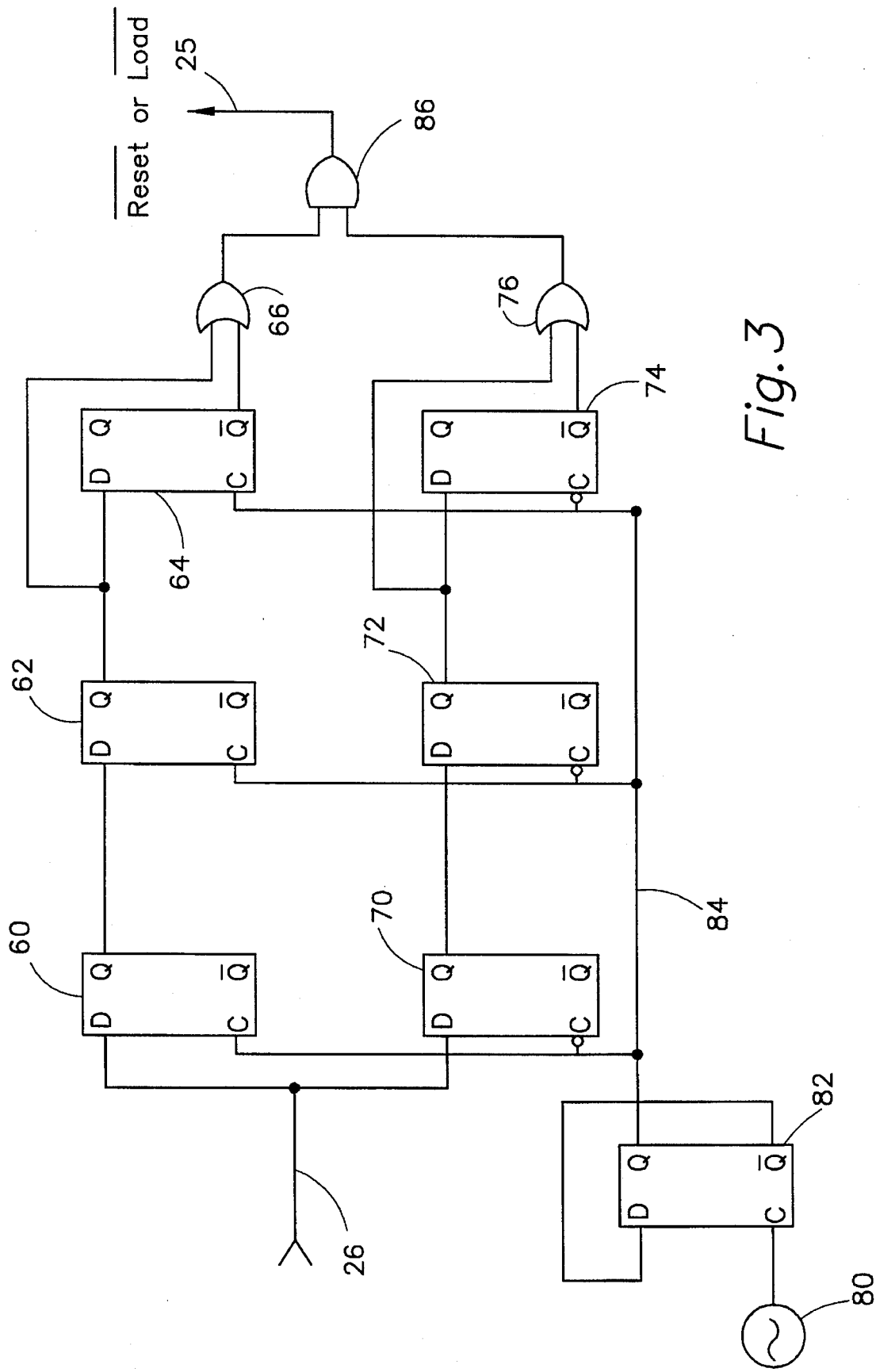
FIG. 3 shows an alternative two-stage synchronizer and one-shot for resetting the counters.

Metastability performance can be increased by having more than a simple two flip-flop configuration synchronizer. FIG. 3 shows a better performing, albeit more complex, synchronizer. Flip-flops 60,62,64 and gate 66; and flip-flops 70,72,74 and gate 76 have the same form and function as flip-flops 18,20,22 and gate 24 of the simple synchronizer as earlier described. The higher performing synchronizer divides the oscillator frequency by two via flip-flop 82. This doubles the available settling time between the first 60,70 and second flip-flops 62,72 in the synchronizers, which greatly reduces the probability of a metastability induced error. However, simply doubling the settling time would also double the delay ambiguity described above. This is solved by having two synchronizers operate in parallel, one clocked on the even oscillator cycles and the other on the odd cycles, which is the same as the positive and negative edges of the half-frequency signal 84. The outputs of the two synchronizers are merged in gate 86. This brings the delay ambiguity back to a single oscillator period. Another correction involves the merged output of the two synchronizers, which holds the counter in the reset state for two extra oscillator periods. This can be corrected by adding 2 to the value loaded into the counter when it is reset/reloaded.

Minimizing the oscillator period while maximizing the clock period means that the counter should be as large as possible. This means making the divisor large for the counter 28 so that the frequency of $CS_x$ is a small fraction of the oscillator frequency.

The counter 28 can be reloaded with a count to compensate for the known loop delay. Other methods of compensation include adjusting the period of the oscillators such that the clock period plus the loop delay equals the desired clock period, or designing the system which uses this clock to assume that the clock period includes the loops delay. These compensation means reduce the circuitry induced error to only the unknown portion of the loop delay.

The $CS_x$ outputs are cross-strapped so that each $CS_x$ is connected to all edge voters (EV) 12. Each D flip-flop associated with each EV operates as an edge detector. The first (left) column of the three (or more) flip-flops 40, 42,44 catches rising edges of all incident $CS_x$ signals. When enough rising edges have been detected, the first m/n gate 46 inside edge voter 12 sets the SR flip flop 48. When this action sets the SR flip-flop 48, the D flip-flop column 40,42,44 (on the left of the diagram) is reset. The second column of flip-flops 50,52,54 and m/n gate 56 perform a similar function as the first column of flip-flops but operate instead on the negative edges of the $CS_x$ signals.

At start-up of the clock circuit, all non-faulty $CS_x$ signals will have the same frequency but not necessarily the same phase as the others. If there are m or more non-faulty $CS_x$ signals at start-up, there will be at least m positive and m negative edges during the first clock period. This guarantees that a falling edge will occur on the $EV_x$ signals, the CS will reset, and all non-faulty signals will be phase-locked within the first clock period after start-up. In conditions where all the oscillators do not start at the same time, phase lock will to occur on the negative edge following the first positive edge of the clock corresponding to the $m^{th}$ CS to start-up. Thus, the worst case time to phase lock is one clock period after the $m^{th}$ non-faulty clock starts.

The edge voters 12 could be replaced by simple m/n voters to save on hardware costs, but this variation is less tolerant of some highly unlikely start-up conditions.

Each independent using subsystem of the present fault tolerant clock, contains a simple m/n voter as shown in the right column of FIG. 1. The number of inputs (n) and the threshold level (m) can be selected differently for each fault containment region to meet the reliability requirements of that particular fault containment region. The embodiment shown in FIG. 1 can tolerate any number of non-Byzantine faults and one Byzantine fault. To increase the number of Byzantine faults to be tolerated, more columns of these m/n voters and the cross connects between them are added, adding one column and one row for each Byzantine fault required to be tolerated, if each subcircuit is a separate fault containment region. If the subcircuits are grouped into common fault containment regions, then there must be at least 3F+1 regions for tolerating F Byzantine faults.

The present invention uses a masking concept in lieu of the typical reconfiguration approach to achieve fault tolerance. This means that the reliability can be determined from combinatorial analysis without requiring use of (semi-) markov methods. The use of masking versus reconfiguration, along with the single-clock-period start-up makes this clocking mechanism very tolerant to single event upset (SEU) and other common transient faults. Through the use of masking, all faults remain latent until their number exceeds the preselected and designed tolerance level. It may be desirable to find these latent faults for maintenance or dispatch condition considerations. Dispatch condition relates to the term used within the aerospace industry to indicate that a particular air vehicle is still safe to fly with respect to the fault status of the systems and subsystems of the air vehicle. These faults can be found by using the count in the counter 28 to establish time windows around the falling and/or rising edges of the $CS_x$. Each fault containment region can check that the edges of signals received from other fault containment regions occur within the corresponding windows. Whenever a signal edge from another fault containment region occurs outside of the corresponding window, a fault alert may be generated.

Figure 2:
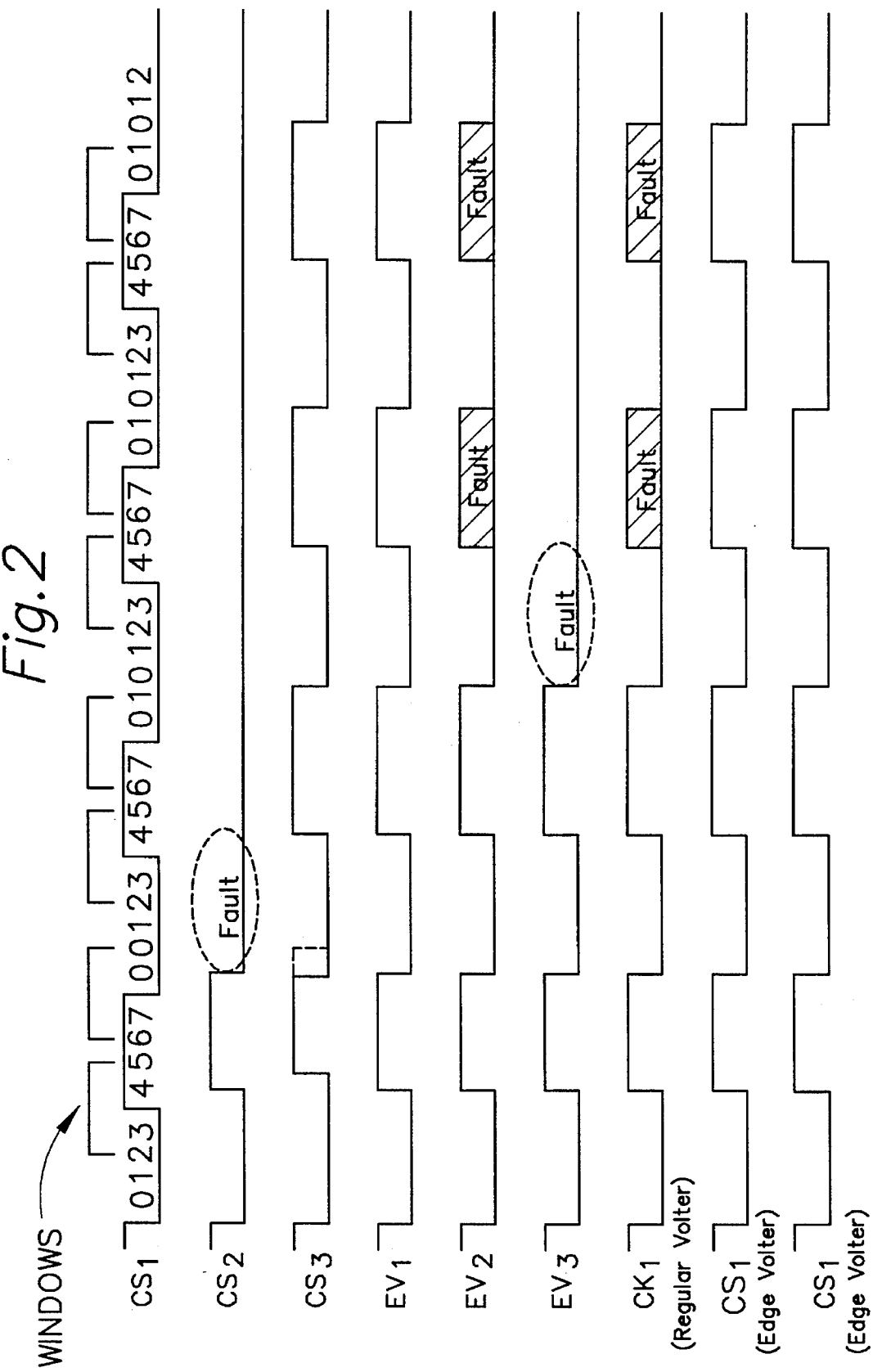
FIG. 2 shows typical voltage waveforms as they traverse the circuitry of the present invention.

FIG. 2 is included as an aide to understanding some of the features of this invention. It depicts the electrical waveforms for the main signals of a homogeneous triplex instantiation of this invention. A homogeneous triplex instantiation uses three of each of the subcircuits CS, EV, and CK. All the m-out-of-n gates are selected with m=2 and n=3; therefore, these are 2-out-of-3 gates. The counters have been simplified to be 3-bit (counts from 0 to 7) counters. This is an extreme simplification so that the diagram fits on a page. An actual instantiation of this invention would use a counter which typically would count to thousands. This simplified instantiation also doesn't show the loading of a delay compensation value. The numbers along the $CS_1$ waveforms show the current value in the associated counter.

The left edge of the waveforms show the signals immediately after the counters have been reset to zero, in synchronism. The CS waveforms then depict an exaggerated drift of the oscillators such that there is an obvious skew between the counters and their CS outputs. It can be seen that the first (CS1) oscillator is the fastest and that the third ($CS_3$) oscillator happens to be the slowest. When the $CS_1$ signal goes high at the EV inputs, it sets its edge detection flip-flop and satisfies one input to the rising-edge 2-out-of-3 gate. When the $CS_2$ signal goes high at the EV inputs, it sets its edge detection flip-flop and satisfies a second input to the rising-edge 2-out-of-3 gate. Since this 2-out-of-3 gate now has sufficient input, its output signal is asserted and sets the EV output high. All EVs, having seen the same inputs, set their outputs high at the same time. All CK subcircuits then see all three of their inputs go high, which exceeds their 2-out-of-3 threshold, and they also set their outputs high.

A similar action takes place when the CS signals go low. An additional action takes place on the falling edge of the EVs. These falling edges reset the counters. Because $CS_1$ is fast, it already has reached a count of one when it gets this reset. The reset forces it to start over at a count of zero which makes it synchronous with $CS_2$ (the median speed oscillator). $CS_3$, being slow, hasn't reached its roll-over point (where it reaches full count and one more count makes it roll-over to zero). Its reset forces it to reach the zero count "prematurely" (i.e. before it would have without the reset). Thus, it reaches the zero count at the same time as $CS_1$ and $CS_2$; placing all signals are back in synchronism as they were at the left edge of the figure. Without failures, this sequence would repeat indefinitely.

The area marked "fault" on the $CS_2$ waveform shows a time region where a failure of $CS_2$ occurs such that it is stuck low. If this fault had not caused $CS_2$ to stay low, its next rising edge would have caused the EVs to go high. In the absence of $CS_2$, $CS_3$ becomes the second rising edge at the EV inputs and its edge causes the EVs to perform as desired. The area marked "fault" on the $EV_3$ waveform shows a time region where a failure of $EV_3$ occurs such that it is stuck low. It can be seen that this additional failure also does not effect the correct operation of the fault tolerant clock outputs (CK signals). The high frequency oscillation on the $EV_2$ waveform at the right of the figure shows rare type of failure of $EV_2$. This is used to show the difference in behavior between a CK subcircuit implemented as a regular voter (as $CK_1$ is) and a CK subcircuit implemented as an edge voter (as $CK_2$ and $CK_3$ are). The extra hardware of an edge voter prevents this rare failure mode from propagating through the CK subcircuits.

The areas marked "windows" can be used for fault detection. They demark regions of counts in the local counter in which all non-faulty signals should transition. If any received signals transition outside of these windows, the CS can assume that a fault has occurred and generate a fault alert.

Many fault tolerant clocking systems require several harmonically related clocks. The present invention may use one of two digital methods to provide harmonically related clocks. The first uses the $CK_x$ signals as the lowest frequency clock. The counter providing intermediate outputs (from flip-flops in the counter) which are voted via simple m/n voters to produce the higher frequency clocks. There is a restriction on this scheme: the intermediate outputs must not include the lower bits of the counter which may go high during the time of the loop delay. This restriction is of no practical concern since systems using harmonically related clocks normally do not use clocks with such a high frequency ratio. A typical instantiation of this invention uses a 16 bit counter which gives a 65536 to 1 ratio, whereas a typical ratio of harmonic clocks is no more than about 16 to 1, which would use only the top (most significant) four of the 16 bits. The loop delay typically would affect only the bottom few bits which would not interfere with using the top four bits for harmonic clocks. When no loop delay compensation is used, a minor problem occurs with this method in that the periods of the higher frequency clock(s) occurring just after the falling edge of the low frequency clock are longer (on average) than periods of the higher frequency clock periods which do not occur just after the falling edge of the low frequency clock. This happens because the reset causes the counters 28 to repeat the counts which occurred during the loop delay. Having the reset reload the counter to compensate for loop delay minimizes this problem and maximizes the clock accuracy.

The second method uses the $CK_x$ signals as the highest frequency clock and divides this down for the other harmonically related clocks If the phase relationships among the lower frequency clocks are important for a given application, a definer clock needs to be created to reset the harmonic dividers at the same time among the fault containment regions. This second method is less accurate than the first because the loop delay error is accumulated at a higher rate.

In addition to these digital methods, the common method of using PLL can be used. In this alternative method, the fault tolerant clock produces the lowest frequency clock. The low frequency clocks drives the PLLs which produce the harmonic clocks. Possible drawbacks to this approach stem from its use of PLLs of the prior art with their attendant analog components, increased lock-in times, and phase jitter.

The regular voters of the embodiment discussed herein may be replaced with edge voters. This costs an increase in hardware expense but tolerates high speed oscillatory faults on $EV_x$.

Figure 4:
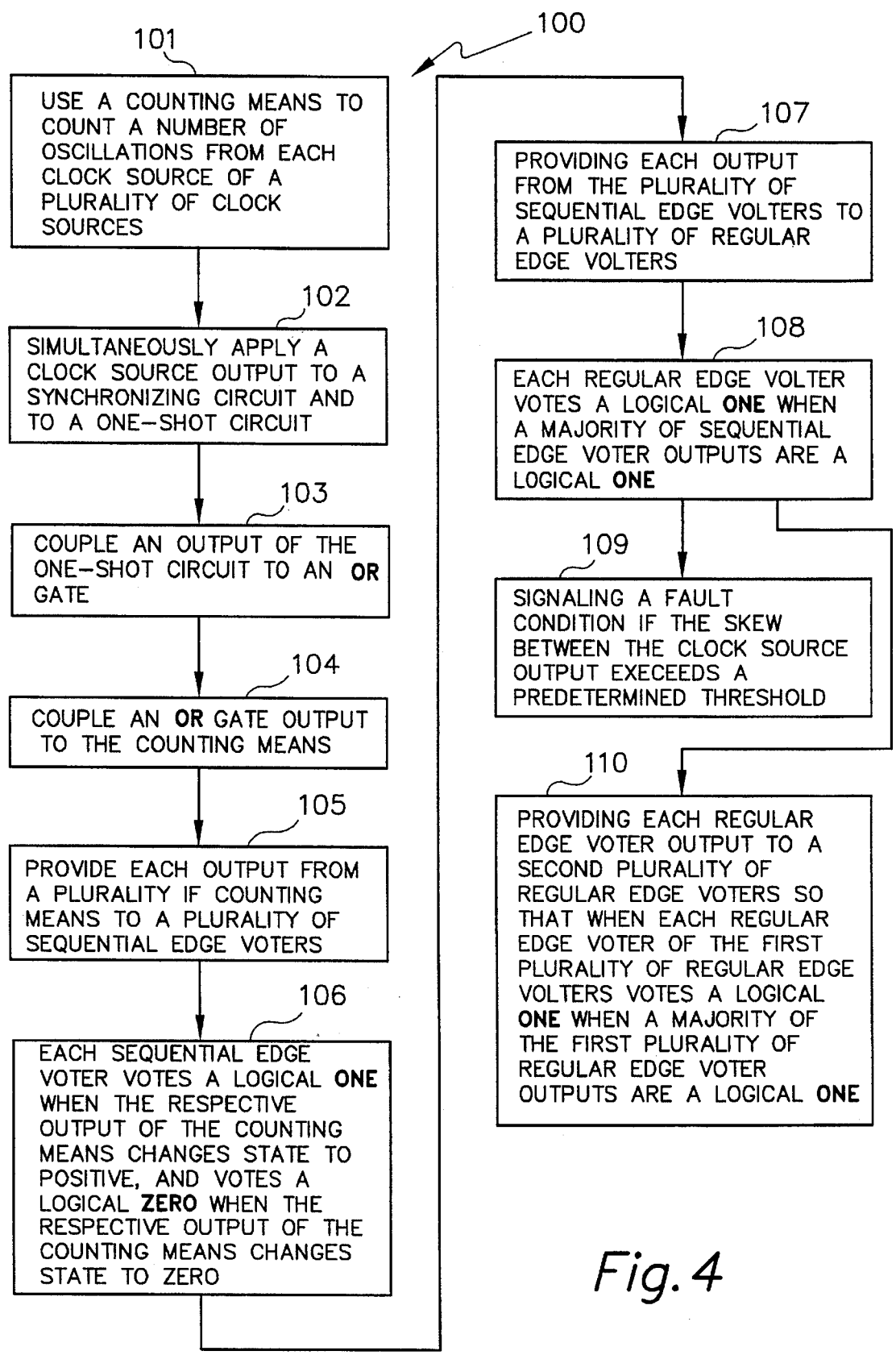
FIG. 4 is a flow diagram of a method for fault detection applied to a system of producing redundant clock signals derived from a plurality of clock sources.

If electrical isolators, which consume large amounts of electrical power for one of the two digital states, power consumption can be reduced by using narrow pulses for all cross-strapped signals. These pulses can be of two widths, one designating the positive edges and another designating the negative edges of the $CS_x$, $EV_x$, and $CK_x$ signals described herein. Pulse width discriminators common in the art can be used to differentiate between the two signals of differing width at the receiving ends of the cross-straps. FIG. 4 is a flow diagram 100 of the invention methodology. The methodology is for fault detection applied to a system of producing redundant clock signals derived from a plurality of clock sources 10. Of flow diagram 100, block 101 pertains to the use of a counting means 28 to count the number of oscillations from each clock source 10 of a plurality of clock sources. Block 102 is the simultaneous application of a clock source 10 output to a synchronizing circuit of flip flops 18 and 20 and a one-shot circuit 22. Block 103 involves the coupling of an output of the one-shot circuit 22 into an OR gate 24. Block 104 involves the coupling of an OR gate 24 output to a counter 28. Block 105 pertains to the providing each output from a plurality of counting means 28 to a plurality of sequential edge voters 12. Block 106 indicates that each sequential edge voter 12 votes a logical one when the respective output of the counting means 28 changes state to a positive and then votes a logical zero when the respective output of the counting means 28 changes state to zero. Block 107 pertains to the providing each output from the plurality of sequential edge voters 12 to a plurality of regular voters 14. Each regular edge voter 14 votes the logical one when a majority of sequential edge voter 12 outputs are a logical one, according to block 108. The signaling of a fault condition if the skew between the clock source 10 output exceeds a predetermined threshold, occurs according to block 109. From block 108 follows block 110 which provides each regular edge voter 14 output to a second plurality of regular edge voters so that when each regular edge voter of the first plurality of regular edge voters votes a logical one, a majority of the first plurality of regular edge voter outputs are a logical one.

While the present invention has been discussed with reference to FIG. 1 in the preferred embodiment, there are a large number of minor variations on this invention which involve trade-offs between circuit complexity, wiring complexity, skew, and fault tolerance. The present invention is meant to be construed liberally in view of the following claims.

I claim:
1. A method for fault detection applied to a system of producing redundant clock signals derived from a plurality of clock sources, comprising the steps of:

counting number of oscillations from each clock source with a counting means;

simultaneously applying a clock source output to a synchronizing circuit and to a one-shot circuit;

electrically coupling an output of the one-shot circuit to an OR gate and then electrically coupling an output of the OR gate to the counting means;

providing each output from a plurality of counting means to a plurality of flip-flops within a plurality of sequential edge voters so that each sequential edge voter votes a logical 1 when a first positive edge of each respective output from the counting means changes state to positive, and thereafter each sequential edge voter votes a logical 0 when a first negative edge of each respective output from the counting means changes state to zero; and providing each output from the plurality of sequential edge voters to a first plurality of regular edge voters so that each regular edge voter votes a logical 1 when a simple majority of sequential edge voter outputs are logical 1.

2. The method of claim 1, further comprising:

signaling a fault condition if the skew between the clock source output signals exceeds a predetermined threshold.

3. The method of claim 1 further comprising:

providing each regular edge voter output to a second plurality of regular edge voters so that when each regular edge voter of the first plurality of regular edge voters votes a logical 1 when a simple majority of the first plurality of regular edge voter outputs are logical 1.

4. An apparatus for producing redundant clock signals comprising:

a plurality of clock sources, each comprising an oscillator means for providing a periodic signal electrically coupled to set an oscillator-driven counter and a synchronizer, wherein the synchronizer in turn is electrically coupled to the oscillator-driven counter as a reset, wherein each clock source has a clock output signal of a preselected frequency responsive to a clock input signal which adjusts only the phase;

a plurality of sequential edge voters electrically coupled to each clock source and wherein each said sequential edge voter responds to a first change of state of a preselected number of the output signals from the clock sources followed by a second change of state, opposite the first change of state, and wherein each sequential edge voter provides a digital sequential edge voter output signal to at least one of the clock sources and thereby controls the phase of at least one of the clock sources;

a plurality of regular voters wherein each regular voter is electrically coupled to receive all the sequential edge voter output signals so that a regular edge voter output is provided that alternates between logical 0 and logical 1, wherein the regular edge voter output is logical 1 when a majority of the digital sequential edge voter output signals are logical 1; and wherein the preselected frequency is set to compensate an average signal propagation delay of the clock source outputs by shortening the next clock period by an amount equal to the average signal propagation delay.

5. An apparatus for producing redundant clock signals comprising:

a plurality of clock sources, each comprising an oscillator means for providing a periodic signal electrically coupled to set an oscillator-driven counter and a synchronizer, wherein the synchronizer in turn is electrically coupled to the oscillator-driven counter as a reset, wherein each clock source has a clock output signal of a preselected frequency responsive to a clock input signal which adjusts only the phase;

a plurality of sequential edge voters electrically coupled to each clock source and wherein each said sequential edge voter responds to a first change of state of a preselected number of the output signals from the clock sources followed by a second change of state, opposite the first change of state, and wherein each sequential edge voter provides a digital sequential edge voter output signal to at least one of the clock sources and thereby controls the phase of at least one of the clock sources; and wherein:

the input signal to each clock source phase adjustment of the output signal further comprises an oscillator-driven counter with a reset electrically coupled to the input signal and driven at a preselected frequency;

average signal propagation delays are determined by temporarily configuring the sequential edge voters to produce a digital state signal whenever a change of state occurs within any one of the clock source output signals, which is followed by a reverse change of state on the same output signal, and one of said clock sources measuring the delay from a respective output signal to a respective input signal; and regular voters, set at m=1, if the regular voters are in the feedback path to inputs of said plurality of clock sources.

6. An apparatus for producing redundant clock signals comprising:

a plurality of clock sources, each comprising an oscillator means for providing a periodic signal electrically coupled to set an oscillator-driven counter and a synchronizer, wherein the synchronizer in turn is electrically coupled to the oscillator-driven counter as a reset, wherein each clock source has a clock output signal of a preselected frequency responsive to a clock input signal which adjusts only the phase;

a first plurality of sequential edge voters electrically coupled to each clock source and wherein each said sequential edge voter responds to a first change of state of a preselected number of the output signals from the clock sources followed by a second change of state, opposite the first change of state, and wherein each sequential edge voter provides a digital sequential edge voter output signal to at least one of the clock sources and thereby controls the phase of at least one of the clock sources; and a second plurality of sequential edge voters electrically coupled to each of the first plurality of sequential edge voters in a cross strapped configuration so that at least one Byzantine fault is tolerated by the apparatus.

* * * * *